(12) United States Patent
Elder (10) Patent No.: US 10,487,742 B2
(45) Date of Patent: Nov. 26, 2019

(54) METHOD FOR REDUCING THERMALLY INDUCED STRESSES IN A HEAT EXCHANGER

(71) Applicant: Hamilton Sundstrand Corporation, Charlotte, NC (US)

(72) Inventor: James S. Elder, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 287 days.

(21) Appl. No.: 15/365,318

(22) Filed: Nov. 30, 2016

(65) Prior Publication Data

US 2018/0149089 A1    May 31, 2018

(51) Int. Cl.
| | | |
|---|---|---|
| *F28F 3/00* | (2006.01) | |
| *F02C 7/18* | (2006.01) | |
| *F01D 25/24* | (2006.01) | |
| *F02C 3/04* | (2006.01) | |
| *F28F 3/08* | (2006.01) | |
| *F28F 19/00* | (2006.01) | |
| *F01D 25/12* | (2006.01) | |
| *F02C 7/14* | (2006.01) | |
| *F28D 9/00* | (2006.01) | |
| *F02K 3/115* | (2006.01) | |
| *F28D 1/053* | (2006.01) | |
| *F28D 7/16* | (2006.01) | |
| *F28D 21/00* | (2006.01) | |

(52) U.S. Cl.
CPC .............. *F02C 7/185* (2013.01); *F01D 25/12* (2013.01); *F01D 25/24* (2013.01); *F02C 3/04* (2013.01); *F02C 7/14* (2013.01); *F02C 7/18* (2013.01); *F28D 9/0062* (2013.01); *F28D 9/0093* (2013.01); *F28F 3/08* (2013.01); *F28F 19/00* (2013.01); *F02K 3/115* (2013.01); *F05D 2220/32* (2013.01); *F05D 2260/213* (2013.01); *F28D 1/05375* (2013.01); *F28D 7/1692* (2013.01); *F28D 2021/0021* (2013.01); *F28D 2021/0026* (2013.01); *F28D 2021/0049* (2013.01); *F28D 2021/0089* (2013.01); *F28F 2265/16* (2013.01); *F28F 2265/26* (2013.01); *F28F 2270/00* (2013.01); *Y02T 50/675* (2013.01)

(58) Field of Classification Search
CPC ............... F28F 2265/14; F28F 2265/26; F28F 2270/00; F28D 1/0443; F28D 2021/0049
USPC .............................. 165/81, 82, 164, 165, 166
See application file for complete search history.

(56) References Cited

U.S. PATENT DOCUMENTS

| 5,758,718 A | * | 6/1998 | de Lazzer | ........... F02B 29/0462 165/149 |
|---|---|---|---|---|
| 6,394,176 B1 | * | 5/2002 | Marsais | ................... F25B 39/04 165/134.1 |

(Continued)

OTHER PUBLICATIONS

EP Communication; Extended European Search Report; Application No. 17204640.1-1007; dated: Apr. 6, 2018; pp. 1-9.

*Primary Examiner* — Davis D Hwu
(74) *Attorney, Agent, or Firm* — Cantor Colburn LLP (57) ABSTRACT

A heat exchanger core includes a rectangular core having a plurality of alternatively stacked first fluid layers and second fluid layers. The core is divided into a plurality of core subsections such that a deflection of each of the plurality of core subsections is less than a deflection of the core as a whole.

20 Claims, 6 Drawing Sheets

(56) References Cited

U.S. PATENT DOCUMENTS

| | | |
|---|---|---|
| 7,234,511 B1 | 6/2007 | Lesage |
| 2005/0006080 A1* | 1/2005 | Kamiyama ............ F28D 1/0443 165/174 |
| 2014/0166236 A1* | 6/2014 | Tan ..................... F28D 1/05366 165/81 |
| 2015/0361891 A1* | 12/2015 | Schwarz .................. F02C 7/14 60/772 |
| 2016/0214216 A1* | 7/2016 | Kim ........................ B23P 15/26 |
| 2016/0377350 A1* | 12/2016 | Jensen ................... F28F 3/025 165/166 |
| 2019/0093953 A1* | 3/2019 | Singh .................. F28D 1/05308 |

* cited by examiner

METHOD FOR REDUCING THERMALLY INDUCED STRESSES IN A HEAT EXCHANGER

BACKGROUND

This application relates to a lubrication system of an engine, and more particularly, to an air-oil heat exchanger associated with a lubrication system of a gas turbine engine.

Gas turbine engines typically include a fan that delivers a supply of air into a compressor section. Compressed air from the compressor section is provided into a combustion section where it is mixed with fuel and ignited. Products of this combustion pass downstream over turbine rotors which are driven to rotate.

Lubrication management systems typically provide lubricant to engine bearings and other components located within the engine. As a result of gears being added to turbofan engines, additional components require cooling, thereby necessitating new cooling systems and methodologies. Heat exchangers are utilized in such systems to maintain lubricant within desired thermal limits by utilizing an airflow to cool the lubricant. However, these heat exchangers are susceptible to failure due to the deflection that occurs as a result of thermal cycling. Such failure can cause lubricant to leak from the heat exchanger, requiring not only replacement of the heat exchanger, but also maintenance of the engine.

SUMMARY

According to an embodiment, a heat exchanger core includes a rectangular core having a plurality of alternatively stacked first fluid layers and second fluid layers. The core is divided into a plurality of core subsections such that a deflection of each of the plurality of core subsections is less than a deflection of the core as a whole.

According to another embodiment, an aircraft engine includes a nacelle cowl, a core engine, and a bypass duct extending between an outer surface of an engine casing of the core engine and an inner surface of the nacelle cowl. A heat exchanger associated with the aircraft engine includes a core having a plurality of alternatively stacked first fluid layers and second fluid layers. The core is divided into a plurality of core subsections such that a deflection of each of the plurality of core subsections is less than a deflection of the core as a whole.

According to yet another embodiment, a method of relieving stress in a heat exchanger includes forming a heat exchanger core including a plurality of alternatively stacked first fluid layers and second fluid layers. The heat exchanger core is divided into at least a first subsection a second subsection such that a deflection of the first subsection and a deflection of the second subsection individually is less than a deflection of the core when considered as a whole.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed system is presented herein by way of exemplification and not limitation with reference to the Figures. It is to be understood that other embodiments may be utilized and changes may be made without departing from the scope of the present disclosure.

Figure 1:
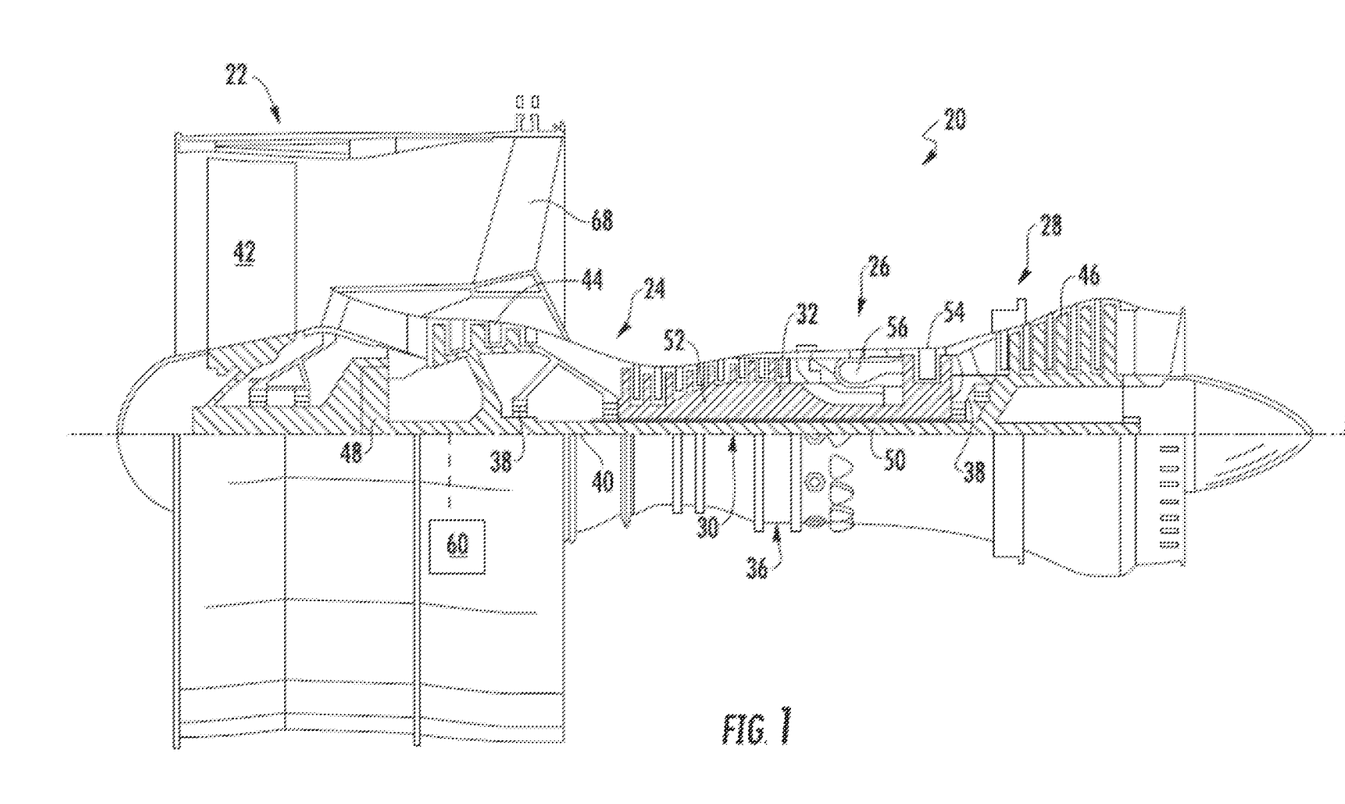
FIG. 1 is a cross-sectional diagram of an example of a gas turbine engine according to one embodiment

With reference to FIG. 1, an example of a gas turbine engine 20 configured for use in the aircraft is illustrated schematically. The gas turbine engine 20 disclosed herein is a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path while the compressor section 24 drives air along a core flow path for compression and communication into the combustor section 26 and then expansion through the turbine section 28. Although depicted as a turbofan gas turbine engine 20 in the disclosed non-limiting embodiment, it should be understood that the concepts described herein are not limited to use with turbofans as the teachings may be applied to other types of turbine engines, such as three-spool architectures for example.

The engine 20 generally includes a low spool 30 and a high spool 32 mounted for rotation about an engine central longitudinal axis A relative to an engine static structure 36 via several bearing systems 38. It should be understood that various bearing systems 38 at various locations may alternatively or additionally be provided.

The low spool 30 generally includes an inner shaft 40 that interconnects a fan 42, a low pressure compressor 44, and a low pressure turbine 46. The inner shaft 40 may be connected to the fan 42 directly or through a geared architecture 48 to drive the fan 42 at a different, typically lower, speed than the low spool 30. The high spool 32 includes an outer shaft 50 that interconnects a high pressure compressor 52 and a high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and the low pressure turbine 46. The turbines 54, 46 rotationally drive the respective low spook 30 and high spool 32 in response to the expansion.

A lubricating system including a pump, illustrated schematically at 60, is operably coupled to and driven by the high spool 32. Operation of the pump 60 causes a lubricating liquid, such as oil for example, to lubricate movable one or more components of the engine 20, such as gears and bearing systems 38 for example. After being supplied to one or more components of the engine 20, the lubricating liquid may be cooled before being recirculated via the pump 60. In an embodiment, a heat exchanger 70 (see FIG. 2) is used to cool the lubricating liquid by arranging a cooling liquid in a heat exchange relationship with the lubricating liquid. The cooling liquid may be an airflow of the engine 20.

Figure 2:
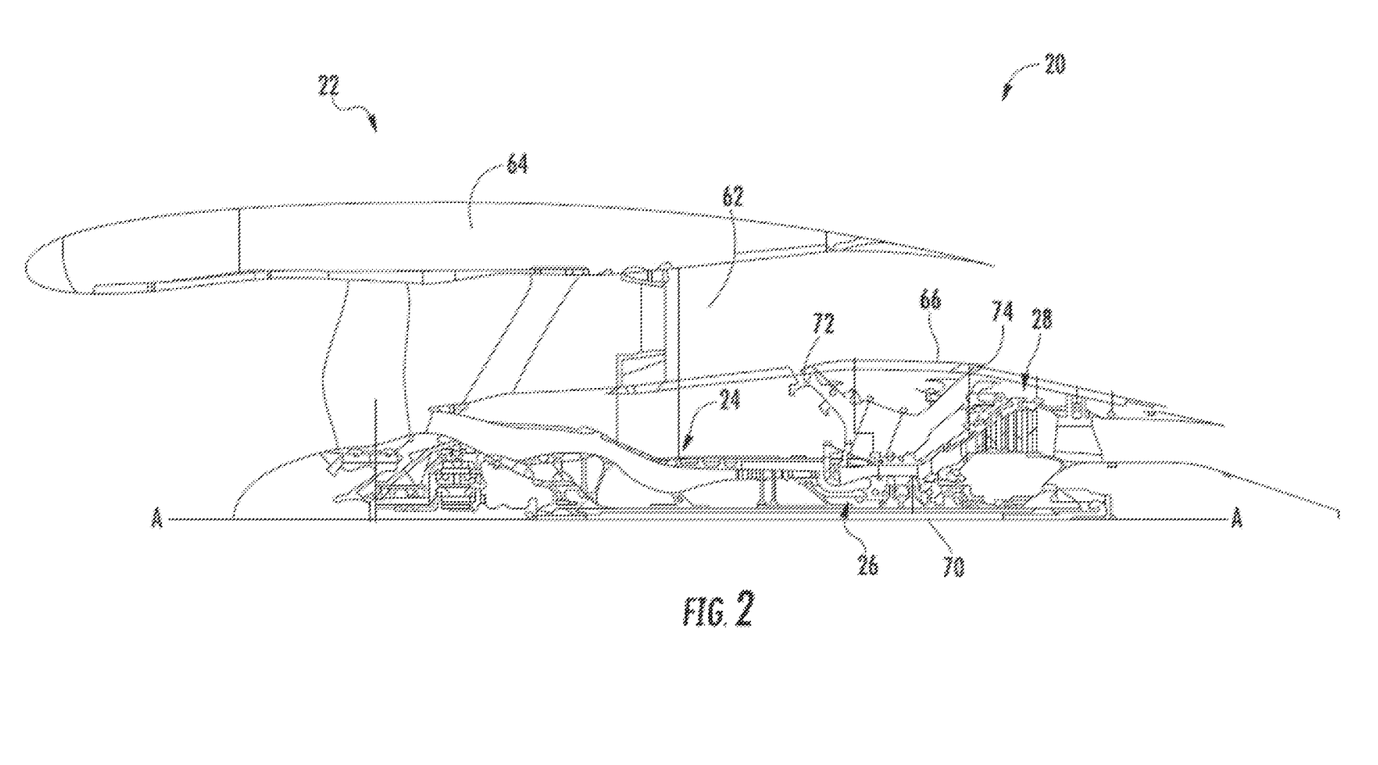
FIG. 2 is another cross-sectional diagram of a gas turbine engine of an aircraft according to one embodiment.

With reference now to FIG. 2, an air bypass duct 62 defining the bypass flow path of the engine 20 extending between an interior of the fan housing 64 and the exterior of the engine case 66 is shown in more detail. In an embodiment, the heat exchanger 70 for cooling the lubricating liquid is positioned within the engine case 66 and is arranged in fluid communication with the air bypass duct 62 such that a portion of the air within the bypass duct 62 is directed into the heat exchanger 70 as the cooling fluid. It should be understood that the heat exchanger 70 may be located at any suitable location of the engine. Further, although the heat exchanger 70 is illustrated and described herein as being configured to use bypass air flow as the cooling fluid, embodiments where air from another portion of the engine 20 is used as the cooling fluid are also contemplated herein.

At least one of an inlet 72 and an outlet 74 associated with the cooling fluid of the heat exchanger 70 may be flush with the surface of the engine case 66. Alternatively, to increase the volume of bypass air provided to the heat exchanger 70, the inlet 72 may be scooped or raised such that the inlet 72 extends beyond the surface of the engine case 66 and into the air bypass duct 62. The heat exchanger 70 is additionally arranged in fluid communication, such as via one or more conduits, with a lubricating reservoir and/or the one or more movable component of the engine 20 to which the lubricating liquid is circulated.

Figure 3:
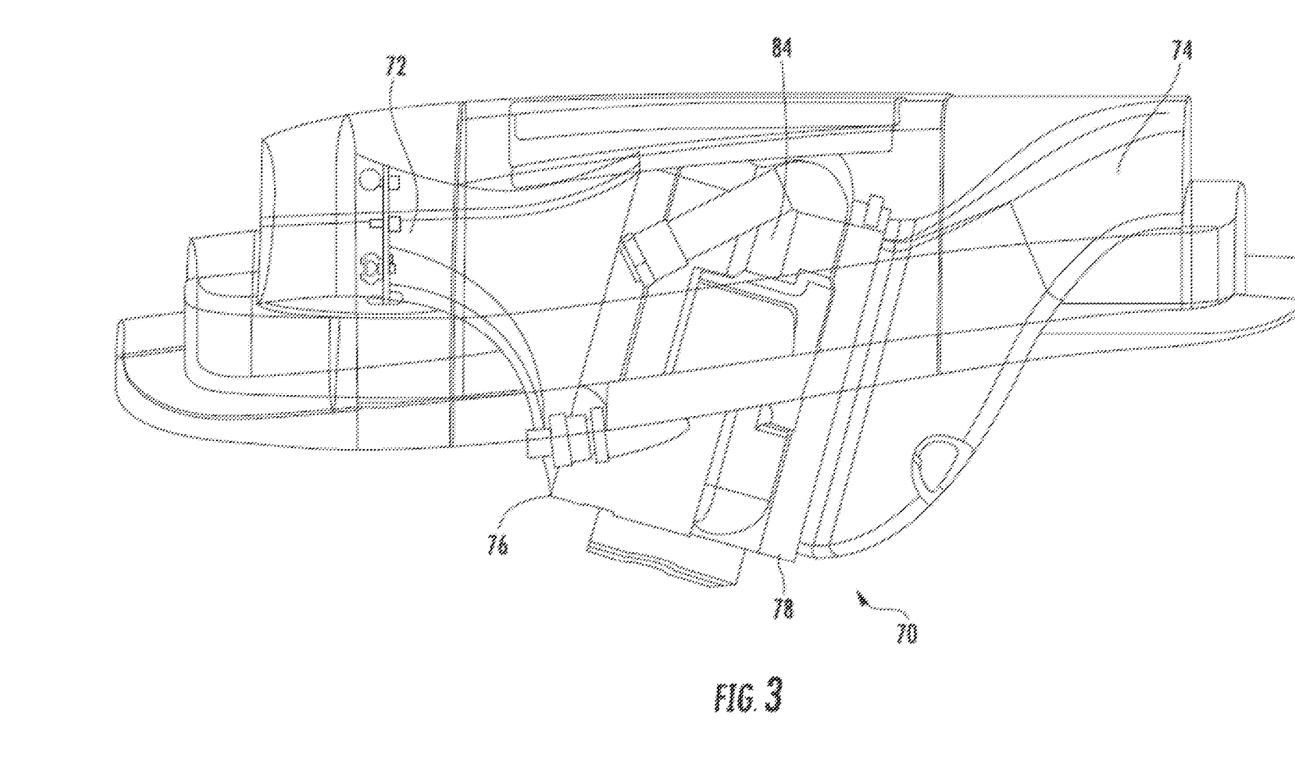
FIG. 3 is a side view of a heat exchanger for use with an engine according to one embodiment.

Referring now to FIG. 3, an example of the air-oil heat exchanger 70 is illustrated in more detail. The air-oil heat exchanger 70 is generally rectangular in shape. An air inlet header 76, an air outlet header 78, a lubricant inlet header 80 (FIGS. 5 and 6), and a lubricant outlet header 82 (FIGS. 5 and 6) are arranged in fluid communication with a core 84 of the heat exchanger 70 such that heat is configured to transfer from the lubricant to the air within the heat exchanger 70. As illustrated, the air inlet header 76, arranged in fluid communication with the inlet 72, and the air outlet header 78, arranged in fluid communication with the outlet 74, are disposed adjacent opposite surfaces of the core 84 for example. However, in other embodiments, such as where the air flow within the heat exchanger 70 has a multi-pass configuration, the air inlet header 76 and the air outlet header 78 may be located adjacent the same surface of the core 84. Similarly, the lubricant inlet header 80 and the lubricant outlet header 82 are shown as being arranged adjacent opposing surfaces of the core 84, for example, a left and right side of the core 84, respectively. However, in other embodiments, such as where the lubricant flow path through the heat exchanger 70 has a multi-pass configuration, the lubricant inlet and outlet headers 80, 82 may be arranged on the same side of the core 84.

Figure 4:
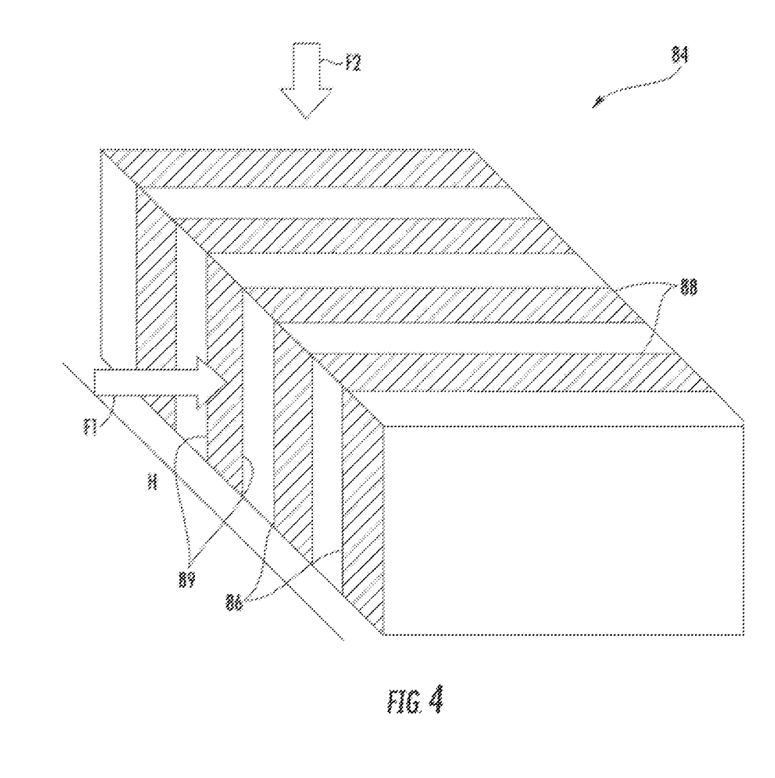
FIG. 4 is a perspective view of a heat exchanger core according to an embodiment.
Figure 5:
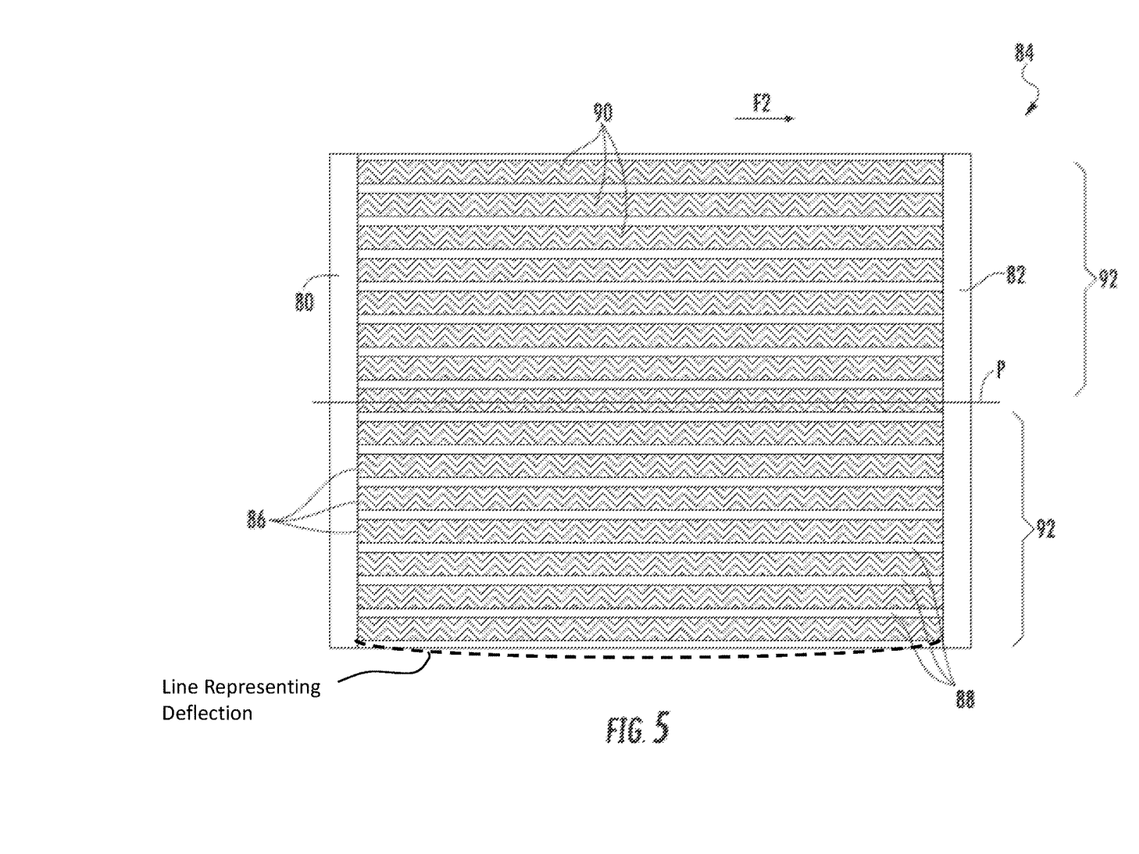
FIG. 5 is a cross-sectional diagram of a heat exchanger core according to an embodiment.
Figure 6:
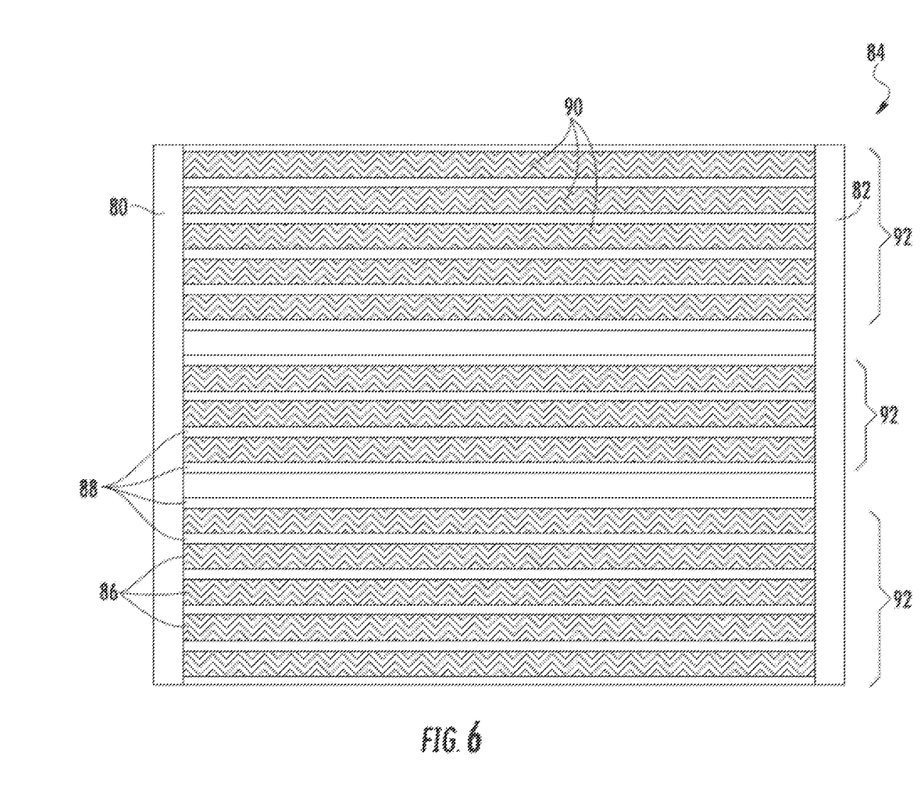
FIG. 6 is a cross-sectional diagram of a heat exchanger core according to another embodiment.

Details of the construction of the core 84 of the air-oil heat exchanger 70 are illustrated in FIGS. 4-6. More particularly, the core 84 of the air-oil heat exchanger 70 has a plate-fin construction with crossflow of a first warm fluid (air) and a second cool fluid there through. The core 84 of the heat exchanger 70 includes a plurality of first fluid layers 86 and second fluid layers 88. The first fluid layers 86 have a fluid pathway such that a first fluid, such as bypass air for example, flows through the core 84 in a first direction, indicated by arrow F1. The second fluid layers 88 have a fluid pathway such that a second fluid, for example lubricant, flows through the core 84 in a second direction, indicated by arrow F2. In one embodiment, the direction of the second fluid flow is substantially perpendicular to the direction of the first fluid flow. However, embodiments where the flows have other configurations, such as counter flow, or cross-counter flow for example are also contemplated herein. The first and second fluid layers 86, 88 are alternately stacked along the height H of the core 84. In an embodiment, thin plates 89 separate adjacent fluid layers 86, 88.

With specific reference to FIGS. 5 and 6, a cross-sectional view of the heat exchanger core 84 taken in a plane perpendicular to the first fluid flow path is illustrated. As shown, each of the plurality of first fluid layers 86 includes an array of fins 90. The fins 90 may be brazed, soldered, welded, or otherwise coupled to a surface of at least one of the adjacent second fluid layers 88. The fins 90 are configured as a heat sink to increase the surface area of the second fluid layers 88 arranged in contact with the cool air flow.

As the air flows through the plurality of first fluid layers 86 extending between the air inlet header 76 and the air outlet header 78, the cool temperature of the bypass air causes the fins 90 to contact and deflect vertically towards a center of the heat exchanger core 84. To reduce this deflection and the corresponding stress placed on the layers 86, 88 of the heat exchanger 70, the core 84 is divided into a plurality of smaller core subsections 92, each subsection 92 having a reduced number of first and second fluid layers 86, 88 compared to the core 84 as a whole. The core subsections 92 may be substantially uniform, or alternatively, may vary in the number of first fluid layers 86 and second fluid layers 88 contained therein based on the anticipated stresses and deflection of the fins 90 in each subsection 92.

In an embodiment, the core subsections 92 are defined by forming one or more cuts through the heat exchanger core 84 oriented parallel to the second fluid layers 88. The plane of the cut, illustrated at P, may extend through a central portion of the fins 90 of one or more first fluid layers 86, as shown in FIG. 5. In another embodiment, the plane P of the cut may be arranged at the interface between the fins 90 and an adjacent second fluid layer 88 such that the array of fins 90 is not connected to the adjacent second fluid layer 88. Alternatively, or in addition, the fins 90 of one or more of the plurality of first fluid layers 86 may be removed, as shown in FIG. 6. By removing the fins between adjacent subsections 92 of the core 84, a clearance is provided into which each of the subsections 92 may deflect, thereby reducing the stresses within the subsection 92. It should be understood that the plurality of subsections 92 of the heat exchanger core 84 may be formed during manufacture of the heat exchanger core 84, or alternatively, after manufacturing of the heat exchanger core 84.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Also, in the drawings and the description, there have been disclosed embodiments of the invention and, although specific terms may have been employed, they are unless otherwise stated used in a generic and descriptive sense only and not for purposes of limitation, the scope of the invention therefore not being so limited. Moreover, the use of the terms first, second, etc., do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A heat exchanger core for a gas turbine engine comprising:
a rectangular core having a plurality of alternatively stacked first fluid layers and second fluid layers,
wherein the core is divided into a plurality of core subsections by a cut formed in the heat exchanger core, the cut being oriented in a plane parallel to a direction of fluid flow through the second fluid layers, the cut extending through a central portion of the fins of one of the first fluid layers such that a deflection of each of the plurality of core subsections is less than a deflection of the core as a whole.

2. The heat exchanger core of claim 1, wherein the cut is formed in at least one plane oriented parallel to the plurality of second fluid layers, the cut dividing the core into the plurality of core subsections.

3. The heat exchanger core according to claim 2, wherein the cut is formed at an interface between one of the plurality of first fluid layers and an adjacent second fluid layer.

4. The heat exchanger core according to claim 2, wherein the cut extends through a central portion of one of the plurality of first fluid layers.

5. The heat exchanger core of claim 1, wherein the plurality of first fluid layers further comprises an array of fins extending between and operably coupled to at least one of the adjacent second fluid layers.

6. The heat exchanger core of claim 5, wherein at least one of the plurality of first fluid layers is absent the array of fins, the at least one first fluid layer absent the arrange of fins dividing the core into the plurality of core subsections.

7. The heat exchanger core of claim 1, wherein the plurality of core subsections are substantially equal.

8. The heat exchanger core of claim 1, wherein the plurality of core subsections have a different number of first fluid layers and second fluid layers.

9. The heat exchanger core of claim 1, wherein the plurality of first fluid layers receive an airflow and the plurality of second fluid layers receive a lubricant flow.

10. The heat exchanger core of claim 9, wherein the heat exchanger core is part of a heat exchanger of an engine.

11. The heat exchanger core of claim 10, wherein the airflow is received from a bypass duct of the engine.

12. An aircraft engine comprising:
a nacelle cowl;
a core engine;
a bypass duct extending between an outer surface of an engine casing of the core engine and an inner surface of the nacelle cowl; and
a heat exchanger associated with the aircraft engine, the heat exchanger including a core having a plurality of alternatively stacked first fluid layers and second fluid layers, wherein the core is divided into a plurality of core subsections such that a deflection of each of the plurality of core subsections is less than a deflection of the core as a whole.

13. The aircraft engine of claim 12, wherein an air flow within the bypass duct is provided to the heat exchanger.

14. The aircraft engine of claim 13, wherein the heat exchanger further comprises an air inlet and an air outlet, wherein at least one of the air inlet and the air outlet is generally flush with the engine casing.

15. The aircraft engine of claim 13, wherein the heat exchanger further comprises an air inlet and an air outlet and the air inlet extends beyond a surface of the engine casing into the bypass duct.

16. A method of relieving stress in a heat exchanger comprising:
forming a heat exchanger core including a plurality of alternatively stacked first fluid layers and second fluid layers; and
dividing the heat exchanger core into at least a first subsection a second subsection such that a deflection of the first subsection and a deflection of the second subsection individually is less than a deflection of the core when considered as a whole.

17. The method according to claim 16, wherein a layer of fins is arranged between the alternatively stacked first fluid layers and second fluid layers and dividing the heat exchanger core into at least the first subsection and the second subsection occurs by removing the layer of fins between the first subsection and the second subsection.

18. The method according to claim 16, wherein dividing the heat exchanger into at least the first subsection the second subsection occurs by forming one or more cuts through the heat exchanger core.

19. The method according to claim 16, wherein the first subsection and the second subsection are substantially uniform.

20. The method according to claim 16, wherein the first subsection and the second subsection have a varied number of at least one of first fluid layers and second fluid.

* * * * *